United States Patent [19]
Doleman

[11] 3,945,781
[45] Mar. 23, 1976

[54] MOLDING APPARATUS TO FORM A THREE DIMENSIONAL PRODUCT ON A WEB MATERIAL

[76] Inventor: Jack Doleman, 5580 New Haven Ave., Melbourne, Fla. 32091

[22] Filed: Dec. 21, 1972

[21] Appl. No.: 317,192

[52] U.S. Cl............. 425/115; 425/122; 425/129 R
[51] Int. Cl.² ........................ B29F 1/00; B29C 3/02
[58] Field of Search ........... 425/113, 114, 115, 246, 425/121, 122, 126, 814; 28/72 P, 73; 264/251, 243

[56] References Cited
UNITED STATES PATENTS

| | | | |
|---|---|---|---|
| 2,282,308 | 5/1942 | Dahlin | 425/814 X |
| 2,534,678 | 12/1950 | Obermann et al. | 425/121 |
| 3,196,490 | 7/1965 | Erb | 425/814 X |
| 3,314,112 | 4/1967 | Hardcastle | 425/246 X |
| 3,507,010 | 4/1970 | Doleman et al. | 425/246 X |
| 3,594,863 | 7/1971 | Erb | 425/115 X |
| 3,594,865 | 7/1971 | Erb | 425/115 X |
| 3,658,971 | 4/1972 | Schickedanz | 425/115 X |

Primary Examiner—Francis S. Husar
Assistant Examiner—Carl Rowold
Attorney, Agent, or Firm—Rose & Edell

[57] ABSTRACT

Continuous production of a molded three-dimensional product employs an indexing rotatable drum having along its periphery a plurality of mold cavities into which molten thermoplastic material is introduced, and a web of material permeable to the molten thermoplastic material and which is guided along the drum periphery. In one embodiment the thermoplastic material enters the cavities through the web to which the thermoplastic is subsequently bonded. The thermoplastic material in the cavities is then shaped and cooled before it is removed from the cavities by dissociating the web from the drum periphery. In a second embodiment the molten thermoplastic material is introduced into the cavities before the web is associated onto the drum periphery. After cooling the thermoplastic to bond it to the web, the web is dissociated from the drum and removes the molded thermoplastic from the cavities.

8 Claims, 3 Drawing Figures

MOLDING APPARATUS TO FORM A THREE DIMENSIONAL PRODUCT ON A WEB MATERIAL

BACKGROUND OF THE INVENTION

The present invention relates to methods and apparatus for the continuous production of molded three-dimensional products.

In the following, the term "three-dimensional" denotes a product having portions such as projections or blades which are substantially greater in length than the thickness of a structure which supports and interconnects the projections or blades.

An apparatus for molding three-dimensional products made for thermoplastic materials is disclosed in U.S. Pat. No. 3,507,010. In this known apparatus a mold surface having cavities therein is advanced with respect to a stationary extruder block mated against the mold surface so that communication exists between the cavities and the extruder block causing a flowable thermoplastic material to be forced into the cavities under high pressure by isolating the cavities from the remainder of the mold. On the mold surface a continuous matrix is formed having projections attached thereto and extending into the cavities of the mold. The matrix is formed under a lower pressure than the projections. After cooling the product is stripped from the mold surface.

This known apparatus suffers from the disadvantage of requiring zones of two different pressures to form the three-dimensional products, namely a high pressure zone for forming the projections and a low pressure zone for forming the heavier and thicker matrix.

SUMMARY OF THE INVENTION

It is an object of the present invention to provide a method and apparatus for the continuous production of molded three-dimensional products wherein the thermoplastic material is charged into mold cavities at a suitable molding pressure and a preformed carrier is applied and bonded to the molded thermoplastic material.

It is another object of the present invention to provide a method and apparatus for the continuous production of molded three-dimensional products wherein the thermoplastic material is charged into mold cavities at atmospheric pressure and a preformed carrier is applied and bonded to the molded thermoplastic material.

It is a broad object of the present invention to provide a method and apparatus for the continuous production of molded three-dimensional products wherein the requirement for zones of differing pressures is eliminated.

According to a first aspect of the present invention, continuous production of a molded three-dimensional product includes a mold having a plurality of mold cavities therein, each cavity being movable in turn step-by-step through a first station. A measured charge of flowable thermoplastic material is introduced into the cavity at the first station, after which the mold is passed to a second station at which a shaping and cooling tool enters the charged cavity to shape and cool the thermoplastic material therein. A third station is provided at which the shaped and molded material is removed from the cavity. A web of material, which is permeable to the thermoplastic material, is guided into contact with the mold at the first station so that the thermoplastic material enters the cavity through the web and is so doing is bonded to the web.

The method according to this aspect of the present invention may be summarized as a continuous production of a molded three-dimensional product which comprises: closing one end of a mold cavity with a web permeable to a thermoplastic material; injecting a charge of the thermoplastic material into the cavity through the web; indexing the cavity and web to a forming station; introducing a shaping and cooling tool into the cavity through the end thereof remote from the web; withdrawing the shaping tool and thereafter removing the web carying the molded thermoplastic shape.

Preferably the mold comprises a rotatable drum having a plurality of angularly spaced rows of mold cavities which may be each indexed in turn past an extruder at the first station, and a reciprocable press having a plurality of forming punches, one punch for each cavity in a row, at the second station. Alternatively, the mold can comprise an endless conveyor having rows of mold cavities. The web, on removal from the mold, is conveniently bonded to a backing before being wound on a take-up roll. In addition means can be provided to deform the molded shapes carried by the web in order to give the product a substantially uniformly distributed tufted appearance.

The permeable web may be formed from plastics, a metal screen or a fiberglass screen. Thus, for example, the web may be precoated with a thermoplastic material which is compatible with the thermoplastic material used to form the molded shapes.

Preferably the forming punches on the press are changeable whereby a variety of different shaped products can be produced by the same mold.

The product which comprises a web or carrier having a tufted surface thereon can find use as matting or carpeting, as artificial turf or grass, as an artificial ski slope surface material or as an artificial soil retention medium for use on slopes or gradients. The above are but examples of a variety of uses for the product.

According to another aspect of the present invention apparatus for the continuous production of a molded three-dimensional product comprises a mold having at least one mold cavity therein, the mold being movable through a first station at which a controlled charge of flowable thermoplastic material is introduced into the cavity. At a second station, a web of a material which is permeable to the thermoplastic material is introduced into the open end of the mold cavity and bonded to the thermoplastic material therein. A third station is provided at which the molded thermoplastic material, bonded to the web, is removed from the mold. Preferably this mold comprises a drum having angularly spaced rows of cavities therein, each cavity containing an insert which defines the shape and form of the thermoplastic material to be bonded to the web. Alternatively the mold can be an endless band having rows of cavities. The web is preferably introduced into each cavity by means of a roll co-operable with the drum to define a nip which partially enters each cavity arriving at the nip. An extruder can be provided to supply molten polymer to an extruder block at the first station for introducing the thermoplastic material into each cavity passing therebeneath. Preferably the extruder block is urged into sealing engagement with the mold by means, for example, of a hydraulic cylinder or cylinders.

The method according to this second aspect of the invention may be characterized as a method for the continuous production of a molded three-dimensional product which comprises; introducing a controlled amount of hot thermoplastic material into at least one mold cavity; transporting the charged cavity into engagement with a web of material which is permeable to the thermoplastic material; and urging the web into the open end of the cavity so as to effect bonding of the web to the molded thermoplastic material.

Preferred moldable thermoplastic materials are polyolefins such as polyethylene and polypropylene; polyfinyl halides such as polyvinyl chloride, polyvinylidene chloride, polyvinyl tetrafluoride, polyvinyl chlorotrifluoride; polyvinylesters such as polyvinyl acetate; and mixtures of copolymers thereof. Other suitable materials include thermoplastic condensation polymers such as polyamides, segmented polyurethanes, polyurethane rubbers, silicone rubbers, natural and synthetic rubbers and polyesters. If required the properties of the thermoplastic material may be modified to improve its durability, performance and appearance by the addition of pigments and stabilizers.

BRIEF DESCRIPTION OF THE DRAWINGS

The above and still further objects, features and advantages of the present invention will become apparent upon consideration of the following detailed description of several specific embodiments thereof, especially when taken in conjunction with the accompanying drawings, wherein.

DESCRIPTION OF THE PREFERRED EMBODIMENTS

Figure 1:
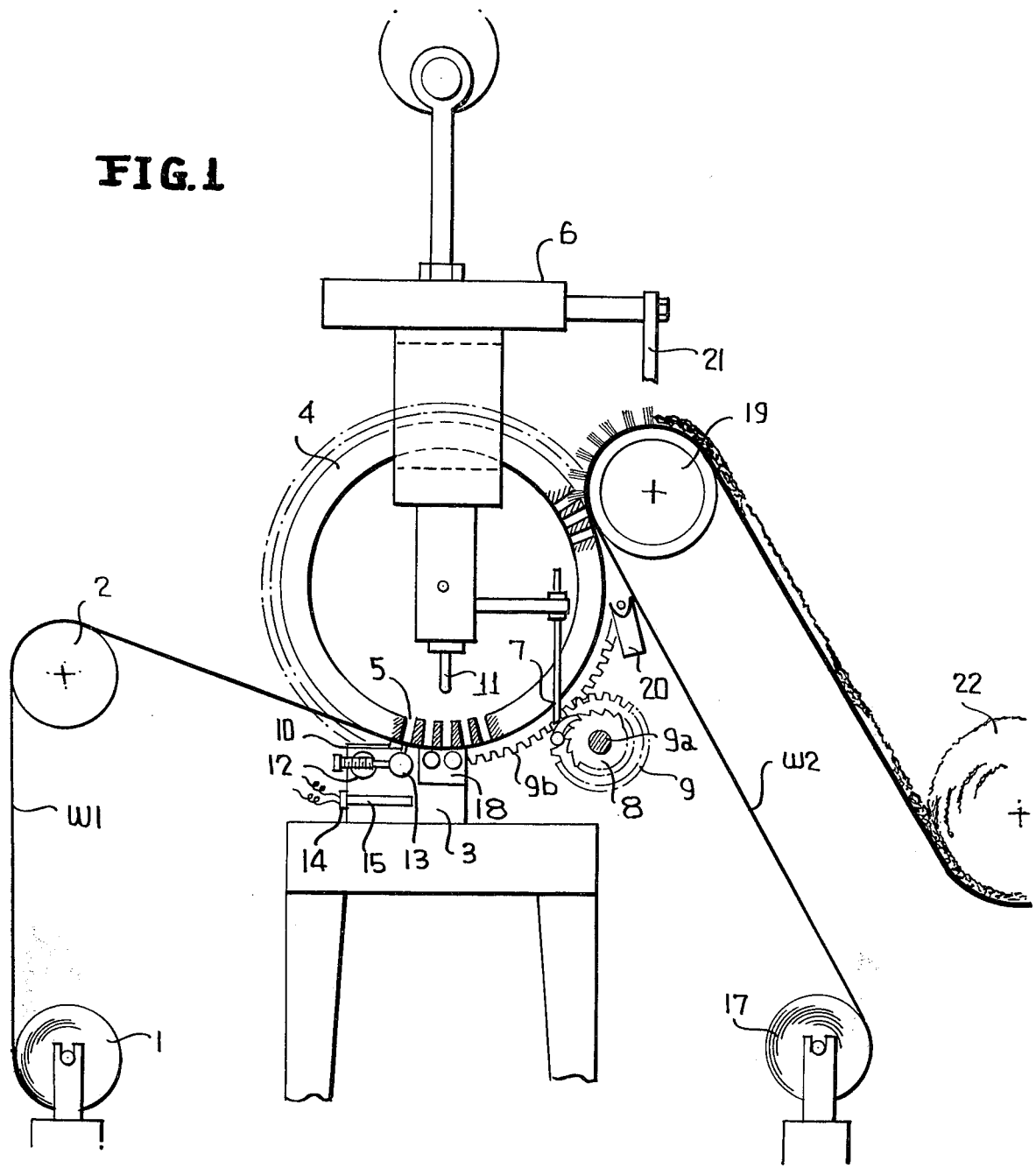
FIG. 1 is a plan view in elevation of a preferred apparatus according to one aspect of the present invention.

Referring specifically to FIG. 1 of the accompanying drawings, a continuous web W1 is drawn off a supply roll 1 and is guided by an idler roll 2 to enter a nip formed between an extruder block 3 and a rotatable mold drum 4. The drum 4 has a plurality of angularly spaced rows of mold cavities 5 in its surface, each row extending into the plane of the drawing. The drum 4 is indexed step-by-step to bring each cavity row 5, in turn, into alignment with a row of extrusion nozzles 10 in the extruder block 3, and then into alignment with a row of forming punches 11.

The extruder block 3 contains a reservoir 12 to receive a molten thermoplastic polymer, the reservoir extending across the width (i.e. into the plane of the drawing) of the extruder block. The molten polymer is supplied at a controlled rate into cavity 13 which communicates with the extrusion nozzles 10. The control of the polymer supply is effected by respective adjustable trimming screws 14. The extruder block 3 is maintained at a substantially uniform temperature by means of cartridge heaters 15.

The mold drum 4 is indexed step-by-step by an amount equal to the angular pitch of the cavity rows 5, whereby to bring each ciavity row into alignment with the nozzles 10 at a first station and into alignment with the forming punches 11 at a second station. The drum is indexed by a reciprocable power press 6. A pawl 7, which is carried by the press 6, actuates a ratchet 8 which is fixedly secured to shaft 9a of a gear wheel 9. The gear wheel 9 is in meshing engagement with a rim gear 9b secured to drum 4. Upon a downward stroke of press 6, forming punches 11 enter a row 5 of mold cavities located therebeneath; drum 4 remains stationary as pawl 7 does not actuate ratchet 8 at this time. During a reverse, upward stroke of press 6, and following the withdrawal of punches 11 from the row of cavities 5, pawl 7 actuates ratchet 8 to index the drum through one step equal to the angular pitch of the rows of mold cavities 5.

The molten polymer is injected into each successive row of cavities through web W1, the web being permeable to the molten thermoplastic material. A desired amount of molten polymer is injected into each cavity in a row 5. Upon indexing the drum, the polymer-filled rows 5 pass over a water-cooled shoe 18 which serves to chill polymer trapped in the spaces of the web W1 whereby to effectively seal the ends of the cavities. Thereafter the forming punches 11 descend into each row in turn to impart a desired shape or form to the molten polymer and at the same time inducing a rapid cooling of the polymer by restraining it in pressure contact with the cold drum 4.

A web W2 of a backing material is reeled off a supply roll 17 and passed over a rubber roll 19 which is maintained in contact with drum 4. A heater 20, having a parabolic reflector, is arranged to direct heat onto the approaching surfaces of the webs W1 and W2 at the nip formed by roller 19 and drum 4. In this way web W1 carrying the shaped forms is bonded to web W2, causing the finished product to be withdrawn from drum 4 and wound upon a take-up roll 22.

A spreader plate 21 is secured to reciprocable press 6 and serves to distribute or re-orientate the shaped thermoplastic forms on the web W1. During a downward stroke of the press, with the web W1 stationary, spreader plate 21 descends onto a row of shaped forms therebeneath and deforms these to spread the forms over the web W1. The amount of deformation is controlled by the movement of spreader plate 21 which is adjustably mounted on press 6.

Figure 2:
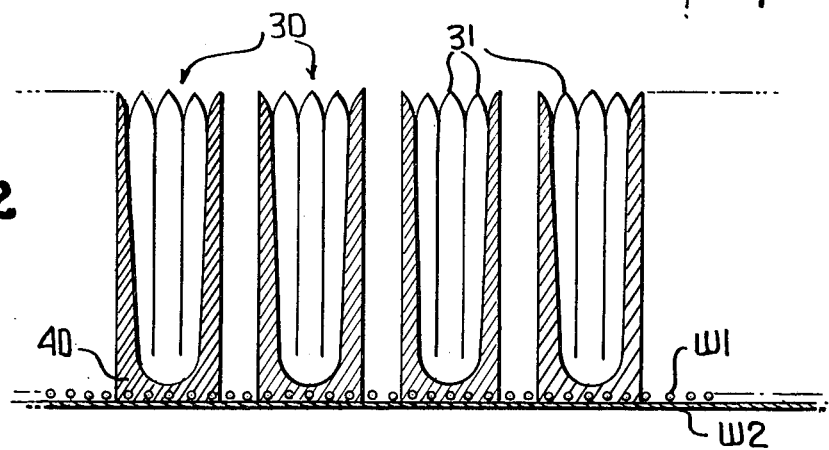
FIG. 2 is a view in section, in enlarged scale, of the product formed by the apparatus of FIG. 1.

FIG. 2 illustrates the product formed by the apparatus prior to the action of the spreader plate 21. The shaped thermoplastic forms 30 are each in the configuration of a cylindrical cup. The cup has a tubular wall which comprises a plurality of separate continuous blades or petals 31 which are joined above the base of the cup so as to be supported and interconnected by a portion 40 whose thickness is substantially smaller than the length of the petals. The number, shape and depth of the blades or petals are determined by the configuration of punches 11. When spreader plate 21 descends upon each row in turn, the blades or petals 31 are deformed such that the blades of one cup intermesh with the blades of adjacent cups so as to give the product received on the take-up roll 22 a closed tufted appearance.

The apparatus illustrated in FIG. 1 is relatively inexpensive and is suitable primarily for short production runs. The molds are easily changed and need not be precision molds.

Figure 3:
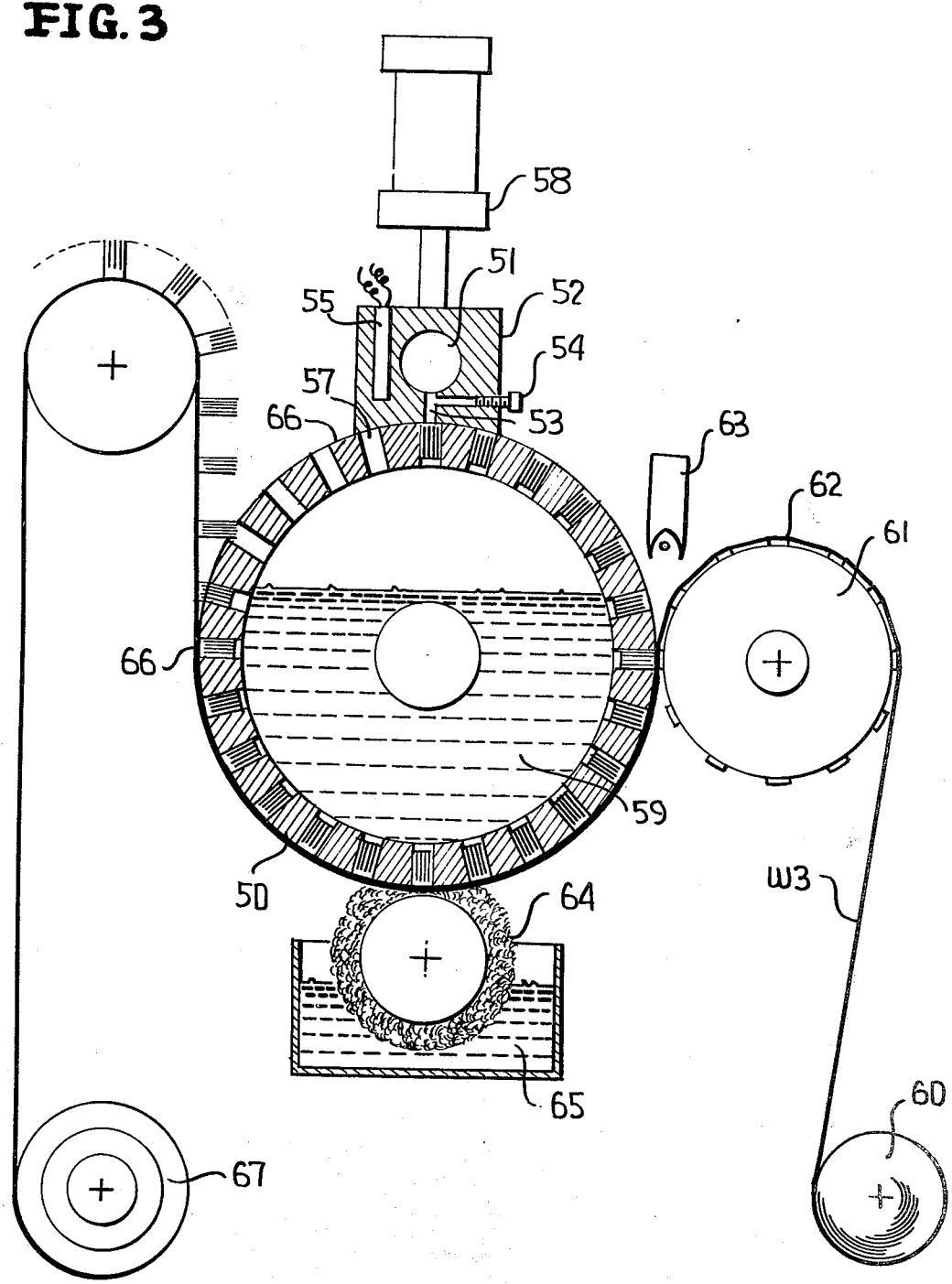
FIG. 3 is a plan view in elevation of a preferred apparatus according to a second aspect of the present invention.

Another apparatus, suitable for fast, large volume production runs, and in which precision molds are utilized, is illustrated in FIG. 3. Specifically, the apparatus illustrated in FIG. 3 comprises an extruder block 52 having a concave face which sealingly abuts the surface of a rotatable mold drum 50. A plurality of angularly spaced rows of mold cavities 57 are provided in the surface of the drum. Each cavity 57 contains a precision insert which defines the shape and form of the thermoplastic material to be bonded to a web, as described subsequently.

The block 52 contains a reservoir 51 for molten thermoplastic material which communicates through ports 53 with each mold cavity in a row of spaced cavities 57 located therebeneath. The flow of thermoplastic material to the cavities is controlled by respective adjustable trimming screws 54. The extruder block is maintained at a substantially uniform temperature by means of cartridge heaters 55 or other suitable means. A hydraulic cylinder or cylinders 58 maintains the extruder in sealing engagement with the drum.

A cooling medium 59, for example water, is circulated through the interior of the drum by way of inlet and outlet ports not shown in the drawing.

A web W3 of material which is permeable to the heated themoplastic material is drawn off a supply roll 60 and passes around a roller 61. Roller 61 is permanently geared for rotation with drum 50 and has peripheral projections 62 which engage in the mold cavities 57. The web W3 passes through the nip formed between the drum 50 and roller 61 and is withdrawn from the drum at a location 66 which is substantially diametrically opposed to the nip. A heater 63, having a parabolic reflector, directs heat onto the nip whereby to bond the web to the thermoplastic material in each mold cavity.

A roller 64, having a resilient covering such as sponge, is rotatable in a water trough 65. The roller 64 serves to assist in the cooling of the thermoplastic material. Upon withdrawal from the drum, the web W3, having rows of molded thermoplastic bonded thereto, is wound about a take-up roll 67.

The molded shape formed in each cavity takes the configuration illustrated in FIG. 2, namely a cup or like member whose peripheral wall is subdivided into a plurality of contiguous blades or petals. The precision inserts in each cavity are adjustable so as to limit the penetration of the thermoplastic material and to control the height of the blades or petals.

In operation, the drum rotates in the indicated direction at a constant speed. As each row of cavities 57 passes beneath the row of ports 63, a charge of hot thermoplastic material is introduced therein and takes the form determined by the inserts. On reaching the nip formed between drum 50 and roller 61, the web W3 is pressed into the open end of each cavity in a row by means of the projections 62. The heat from heater 63 assures that a bond is established between the thermoplastic material and the web, the thermoplastic material permeating at least partly into the web. In passing from the nip to the withdrawal location 66 the thermoplastic material is cooled by the medium 59 in the drum and by the water saturated sponge on roller 64. A scraper blade or the like may be arranged at location 66 to assist in removal of the web W3 from the drum.

Although not illustrated in FIG. 3, means can be provided for spreading the tufts of molded thermoplastic material, bonded to the web W3, into an intermeshing carpet or mat prior to take-up by the roll 67. This can be achieved, as illustrated in FIG. 1, by deforming the individual blades or petals of each molded shape formed by the mold cavities.

The three-dimensional product produced by the present method and apparatus can find use as matting or carpeting, artificial turf or grass, an artificial ski slope surface material or artificial soil retention medium for use on slopes or gradients. The above are but examples of a variety of uses for the product.

While I have described and illustrated several specific embodiments of my invention, it will be clear that variations of the details of construction which are specifically illustrated and described may be resorted to without departing from the true spirit and scope of the invention as defined in the appended claims.

I claim:

1. Apparatus for the continuous production of a molded three-dimensional product comprising;
    a mold having a plurality of rows of spaced mold cavities therein, the rows being movable through a first station at which controlled charges of flowable thermoplastic material are simultaneously introduced only into each mold cavity of the row at said first station;
    a second station at which a web of a material which is permeable to the thermoplastic material is introduced into the open end of said mold cavities, one row at a time, and bonded to the spaced thermoplastic material charges therein; and
    a third station at which the molded thermoplastic material bonded to the web is removed from the mold;
    wherein the mold comprises a drum having angularly spaced rows of cavities therein, each cavity containing an insert which defines the shape and form of the thermoplastic material to be bonded to the web.

2. Apparatus as claimed in claim 1, further including a roller cooperable with said drum to define a nip and having at least one projection thereon to enter said mold cavity as it arrives at the nip to introduce said web into said mold cavity.

3. Apparatus as claimed in claim 2, in which the drum is hollow so as to be coolable by flowing cooling medium through the drum core.

4. Apparatus as claimed in claim 1 including an extruder for supplying molten polymer to an extruder block at the first station to introduce the thermoplastic material into said cavity located therebeneath.

5. Apparatus as claimed in claim 4, including means urging the extruder block into sealing engagement with the mold.

6. Apparatus for the continuous production of a molded three-dimensional product in the form of a preformed carrier web to which spaced molded thermoplastic projections are directly bonded, said apparatus comprising:
    a movable mold member having a series of spaced open-ended mold cavities defined in a surface thereof;
    extrusion means for selectively issuing flowable thermoplastic material from a predetermined location toward said mold surface;
    means for guiding a preformed web along at least a portion of said mold surface and over the open end of at least some of said cavities, said web being of a material which is permeable to said flowable thermoplastic material, said means for guiding being arranged to permit said web to be moved with said mold surface in response to movement of said mold member;

drive means for moving said mold member to successively position at least one mold cavity at a time in place at said predetermined location to receive said flowable thermoplastic material from said injection means into the open end of the receiving mold cavity; and means for solidifying the thermoplastic material in said mold cavities to bond the thermoplastic material to said web;

wherein said mold cavities are configured and spaced such that the solidified thermoplastic material from each cavity is completely separated along said web from the solidified thermoplastic material from all other cavities;

wherein said mold comprises a rotatable drum having a plurality of said open-ended cavities defined in its periphery, said drum being indexed to stop at a plurality of specific positions wherein said cavities are aligned with respective work stations; and wherein said web is guided along said drum at a first work station so that flowable thermoplastic material enters the cavities at said first work station through the web, said web being movable with said drum to a second work station; and further comprising shaping means at said second work station arranged to enter cavities positioned thereat to shape and cool the thermoplastic material therein.

7. Apparatus for the continuous production of a molded three-dimensional product in the form of a preformed carrier web to which spaced molded thermoplastic projections are directly bonded, said apparatus comprising:

a movable mold member having a series of spaced open-ended mold cavities defined in a surface thereof;

extrusion means for selectively issuing flowable thermoplastic material from a predetermined location toward said mold surface;

means for guiding a preformed web along at least a portion of said mold surface and over the open end of at least some of said cavities, said web being of a material which is permeable to said flowable thermoplastic material, said means for guiding being arranged to permit said web to be moved with said mold surface in response to movement of said mold member;

drive means for moving said mold member to successively position at least one mold cavity at a time in place at said predetermined location to receive said flowable thermoplastic material from said injection means into the open end of the receiving mold cavity; and means for solidifying the thermoplastic material in said mold cavities to bond the thermoplastic material to said web;

wherein said mold cavities are configured and spaced such that the solidified thermoplastic material from each cavity is completely separated along said web from the solidified thermoplastic material from all other cavities;

wherein said mold comprises a rotatable drum having a plurality of said open-ended cavities defined in its periphery, said drum being indexed to stop at a plurality of specific positions wherein said cavities are aligned with respective work stations; and wherein said web is introduced onto said drum periphery adjacent cavities into which said flowable thermoplastic material has already been introduced.

8. Apparatus for the continuous production of a molded three-dimensional product comprising:

a mold having a plurality of mold cavities therein, each cavity being movable in turn step-by-step through a first station, means for introducing a measured charge of flowable thermoplastic material into the cavity at the first station;

a second station;

a shaping and cooling tool located at said second station and arranged to enter the charged cavity to shape and cool the thermoplastic material therein;

a third station;

means at said third station for removing the shaped and molded material from the cavity;

means for stepping each cavity to said stations in sequence and for actuating the shaping and cooling tool when a cavity is stationary at the second station; and means for guiding a web of material, which is permeable to said thermoplastic material, into contact with the mold at the first station such that the thermoplastic material enters the cavity through the web;

wherein the mold comprises: a rotatable drum having a plurality of angularly spaced rows of said mold cavities which may be each indexed in turn past said first station; an extruder at said first station; and a reciprocable press having a plurality of forming punches, one punch for each cavity in a row, said press being located at the second station.

* * * * *